(No Model.)
J. H. McEVOY.
ELECTRIC CAR BRAKE.
No. 507,589. Patented Oct. 31, 1893.
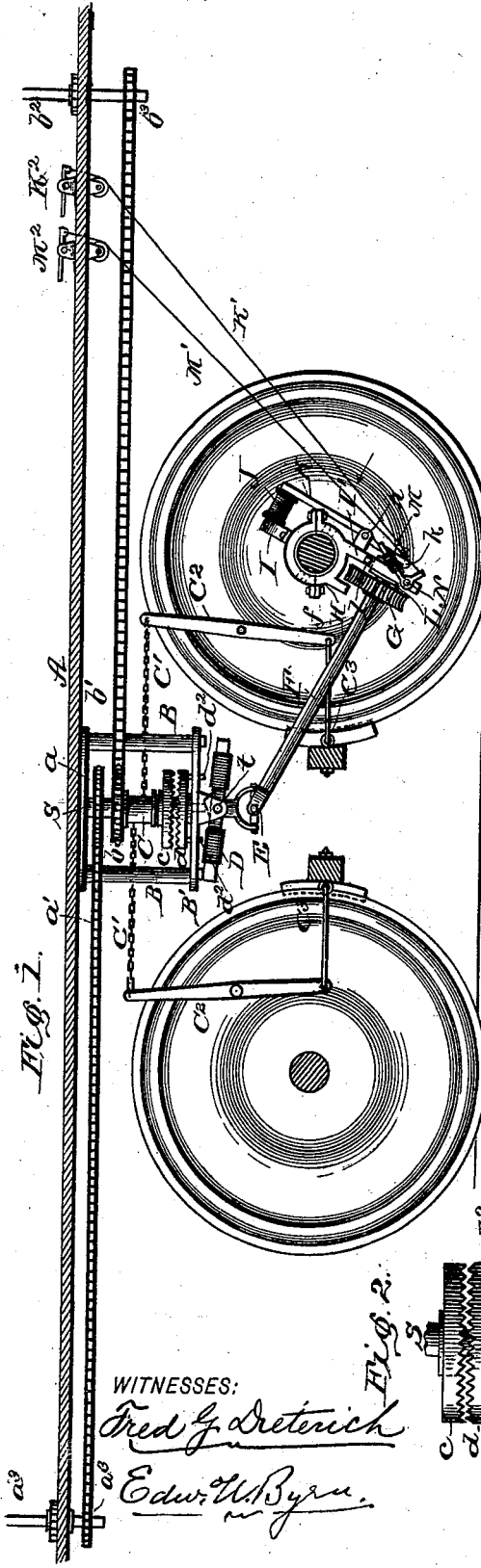
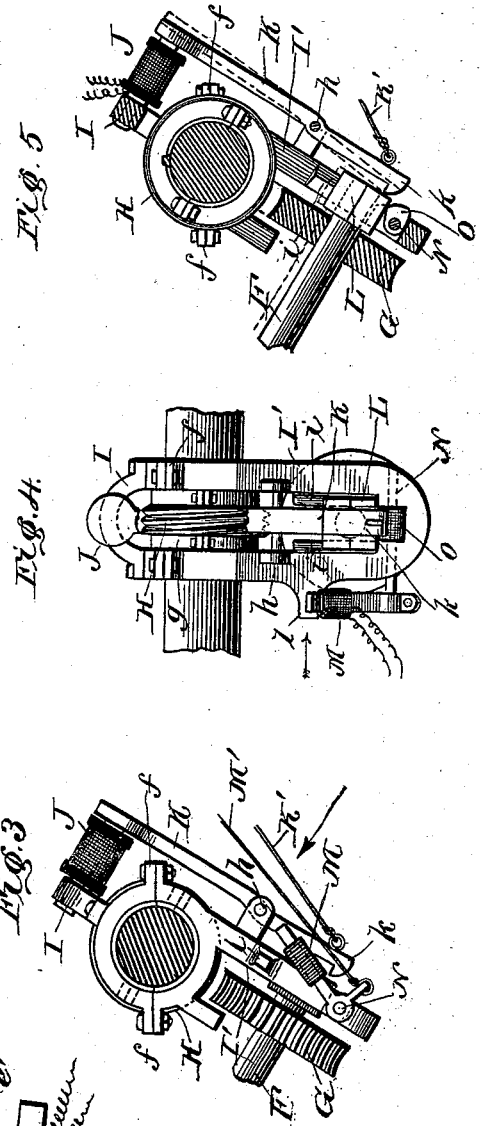
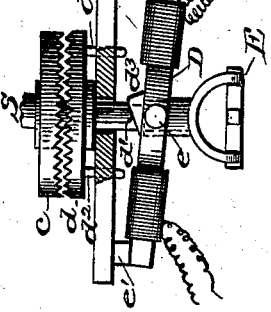
WITNESSES:
Fred G. Dieterich
Edw. U. Byrn
INVENTOR
Joseph H. McEvoy.
BY Munn & Co
ATTORNEYS.

UNITED STATES PATENT OFFICE.

JOSEPH H. McEVOY, OF WATERBURY, CONNECTICUT.

ELECTRIC CAR-BRAKE.

SPECIFICATION forming part of Letters Patent No. 507,589, dated October 31, 1893.

Application filed December 30, 1892. Serial No. 456,795. (No model.)

*To all whom it may concern:*

Be it known that I, JOSEPH H. MCEVOY, of Waterbury, in the county of New Haven and State of Connecticut, have invented a new and useful Improvement in Electro-Mechanical Car-Brakes, of which the following is a specification.

The object of my invention is to provide an electro-mechanical car brake, in which the brakes may be set into action automatically through the momentum of the car by an electrical device, and in which also the same devices may be operated mechanically if desired to make available the momentum of the car, or in which the brakes may be operated by the power of the brakeman by hand in the usual way.

To these ends my invention consists in the peculiar construction and arrangement of devices as will be hereinafter fully described.

Figure 1 is a vertical longitudinal section through the bottom of the car and across its axles, showing my devices applied. Fig. 2 is an enlarged sectional detail of the devices attached to the bottom of the car and Figs. 3, 4, and 5 are sectional and side views in detail on an enlarged scale of the devices suspended from the axle.

In the drawings A represents the bottom of the car to which is firmly attached in a suspended position the metal frame B B'. A short vertical shaft S is arranged within this frame, and is provided with a rigid drum C upon which is wound the chains C' connected to brake levers C², by which the brake shoes C³ are applied to the peripheries of the car wheels. On the shaft S is fixed a rigid clutch section c, and just below it is a corresponding clutch section d, which is loose on the shaft and free to slide vertically, but is held against turning by pins $d^2 d^2$ depending through holes in the fixed plate B' of the frame work. At its lower end the shaft S is connected by a universal joint E to a rotary shaft F which bears at its lower end a rigidly attached worm wheel G. This worm wheel is arranged to be thrown into gear with a worm H rigidly fixed to the axle, so as to cause the power of the car axle to rotate shafts F and S and wind up the brake chains on drums C to apply the brakes. For giving the necessary adjustment to this worm wheel G to throw it in and out of gear, I provide the following construction of parts. On the axle I suspend a hanger frame I I', which is made in two parts connected around the axle by flanges and bolts $f$ so as to permit the devices to be applied to any car axle without taking off the wheels. The car axle revolves freely within this hanger frame, but has within the frame a rigid worm H, Fig. 4, also made in two sections and bolted on the axle for the same reason that the frame I I' is applied in this way. The lower part I' of this frame is formed with parallel guide ways $i\ i$ within which slides a two part journal box L, which carries the lower end of the shaft F. To adjust this box up and down, to cause the worm wheel G to alternately engage and separate from the worm on axle, I provide in the lower end of the frame I' a horizontal shaft N bearing a cam O upon which the box L is sustained, and this shaft is rocked to cause its cam to lift the box when desired to connect the worm gear as follows—On the end of the shaft is a rigid arm bearing an electro-magnet M, which acts upon an armature $l$ formed by an extension of the frame I', see Fig. 4, so that when an electric circuit is closed through this magnet, it moves to the armature and rocks the shaft N to which it is attached, and through the cam O lifts the box L and connects the worm gears. Instead of operating this shaft electrically, it may be operated mechanically by a pull rod M' and treadle M². When the worm gears G H are engaged they are locked in this position by a locking catch $k$ formed on the lower end of a lever K, fulcrumed at $h$ to the frame I' and having its upper end fashioned into an armature that plays upon the pole of an electro magnet J fixed to the upper part I of the hanger frame. When the journal box rises to the coupled position of the gears the catch $k$ moves under it from the gravity of the upper and heavier end of the lever, as shown in dotted lines in Fig. 5, but when the box is to be lowered to disconnect the gears, this may be accomplished by closing an electric circuit through the magnet J, which then attracts the upper end of lever K and withdraws the catch $k$ from beneath the journal box, allowing the latter with the end of shaft F to drop, which brings the worm wheel G out of contact with the actuating worm on the shaft. This same result may be accomplished mechanically by a pull rod K' and treadle K².

When the brakes are applied by the turning of the shaft S, either by hand or automatically, it may be desired to lock them so applied, and for this purpose the clutch $d$ (which cannot turn by reason of its pins $d^2$) is raised to engagement with the clutch section $c$. For this purpose a double electro magnet D is provided whose core has its middle enlarged and provided with an opening through which the shaft S passes. This magnet has its core fulcrumed on trunnions in lugs $t$ Fig. 1, depending from the frame plate B'. The two opposite ends of the core are wound with helices of wire, and the ends of the poles project far enough to strike lugs $e'$ $e'$ Fig. 2 on the frame plate which latter act as armatures to the two magnets. The middle portion of the magnet is provided with cam projections $d^3$ upon which are supported the downwardly projecting pins $d'$ of the clutch section $d$, so that one movement of the double magnet, as it oscillates, will throw the clutch section down, as in Fig. 2, and the other movement will throw it up and cause it to lock the shaft S, so that the brakes cannot become unlocked. By closing an electric circuit through one of the helices of the double magnet it is tilted one way, and by closing an electric circuit through the other helix it is tilted in the reverse direction to give the necessary adjustment of parts just described.

From the above description it will be seen that the brakes are set into action electrically, but the braking power is supplied automatically by the momentum of the car. To provide for the application of the brakes by hand, the shaft S is provided with sprocket wheels $a$ and $b$ and these are connected by chains $a'$ $b'$ to sprocket wheels $a^3$ $b^3$ on the lower ends of the ordinary vertical brake shaft, $a^2$ $b^2$.

Instead of using a universal joint where the shafts S and F connect, I may use a flexible shaft section connecting the two, or a bevel gear.

As a further modification, instead of connecting these devices to the bottom of the car, I may attach them to and support them on the frame work of the trucks.

Having thus described my invention, what I claim as new, and desire to secure by Letters Patent, is—

1. The combination with the brakes of a car, and its axle; of connecting mechanism for the two, a worm gear interposed in said connecting mechanism, the parts of said worm gear being made separable, and an electro magnet operating to connect said parts of the worm gear substantially as shown and described.

2. The combination with a vertical shaft S fixed in bearings beneath the car and having a winding drum for the brake chains, a shaft F connected to said shaft S by a universal joint and having a worm gear G at its lower end, a sliding journal box for this end of the shaft, a hanger frame suspended upon the axle of the car and carrying said journal box, a worm on the axle, and means for throwing the worm wheel into the worm substantially as shown and described.

3. The combination with the car axle having a worm thereon; of the hanger frame suspended loosely on the axle and carrying guides $i$ $i$, and catch lever K $k$, the sliding box L, carrying shaft F with worm wheel G, the shaft N with cam O, and means for operating the catch lever and cam shaft substantially as shown and described.

4. The combination with the car axle having a worm thereon; of the hanger frame I I' suspended loosely on the axle and carrying electro magnet J, guides $i$ $i$, and catch lever K $k$, the sliding box L carrying shaft F with worm wheel G, the shaft N with cam O arranged to lift the sliding box, and an electro magnet M arranged to rock the shaft N substantially as shown and described.

5. The combination of the shaft S having clutch section $c$, brake mechanism attached to the shaft, the supporting frame B B', loose clutch section $d$, with pins $d'$ and an electro magnet arranged to lift the pins $d'$ and close the clutch sections substantially as shown and described.

6. The combination of the shaft S having clutch section $c$, brake mechanism attached to the shaft, the supporting frame B B', loose clutch section $d$ having pendent pins $d^2$ locking in the frame plate and pins $d'$, a double electro magnet fulcrumed to the frame plate about its middle and having cams $d^3$ about its middle and separate helices at each end, and armatures $e'$ $e'$ carried by the frame plate substantially as shown and described.

JOSEPH H. McEVOY.

Witnesses:
 EDWD. W. BYRN,
 P. B. TURPIN.